United States Patent [19]

Hashimoto et al.

[11] Patent Number: 4,525,737
[45] Date of Patent: Jun. 25, 1985

[54] COLOR SOLID STATE IMAGE PICK-UP DEVICE

[75] Inventors: Seiji Hashimoto, Kanagawa; Akira Suga, Tokyo; Nobuyoshi Tanaka, Kanagawa, all of Japan

[73] Assignee: Canon Kabushiki Kaisha, Tokyo, Japan

[21] Appl. No.: 629,747

[22] Filed: Jul. 11, 1984

Related U.S. Application Data

[63] Continuation of Ser. No. 374,883, May 4, 1982, abandoned.

[30] Foreign Application Priority Data

May 11, 1981 [JP] Japan .................................. 56-69377
May 11, 1981 [JP] Japan .................................. 56-69378

[51] Int. Cl.$^3$ ............................................... H04N 9/07
[52] U.S. Cl. ................................................ 358/44
[58] Field of Search .......................... 358/44, 172, 177

[56] References Cited

U.S. PATENT DOCUMENTS

| | | | |
|---|---|---|---|
| 3,560,637 | 1/1968 | Takeuchi | 358/44 |
| 3,784,734 | 1/1974 | Watanabe | 358/44 |
| 4,038,690 | 7/1977 | Hoagland | 358/213 |
| 4,121,244 | 10/1978 | Nakabe | 358/44 |
| 4,245,241 | 1/1981 | Sato | 358/44 |
| 4,437,112 | 3/1984 | Tanaka et al. | 358/44 |

Primary Examiner—Michael A. Masinick
Attorney, Agent, or Firm—Toren, McGeady, Stanger, Goldberg & Kiel

[57] ABSTRACT

In the disclosed solid state image pick-up device, different kinds of color filters are mounted relative to photoelectric picture elements and a correlative process arrangement obtains the correlative output of each picture element and that of a predetermined adjacent picture element. An inversion control arrangement inverts the correlative output of the correlative process arrangement at predetermined periods.

17 Claims, 27 Drawing Figures

FIG. 7a DIFFERENTIAL SIGNAL 13a'

FIG. 7b INVERSION CONTROL SIGNAL 14a

FIG. 7c MULTIPLICATION SIGNAL 15a

FIG. 7d R−B SIGNAL 16a'

FIG. 7e MULTIPLICATION SIGNAL 15a

FIG. 7f R−B SIGNAL 16a"

FIG.8

COLOR SOLID STATE IMAGE PICK-UP DEVICE

This is a continuation of application Ser. No. 374,883, filed May 4, 1982 now abandoned.

BACKGROUND OF THE INVENTION

1. Field of the Invention

The present invention relates to a color solid state image pick-up device, particularly with color mosaic filters arranged to correspond to each picture element of the solid state image sensor.

2. Description of the Prior Art

Generally, in such a color solid state image pick-up device, the method of obtaining a standard TV signal with only one solid state image sensor involves obtaining the desired color signal by correlatively processing the signals of adjacent picture elements. For example, it has been known to provide complementary color filters in a color resolving filter by comparing the output of the picture elements corresponding to the complementary color filter with those of the picture element of other color filters so as to obtain the original color signals of R(Red), B(Blue) and G(Green) or the color differential signals (R-G), (B-G) . . .

Figure 1:
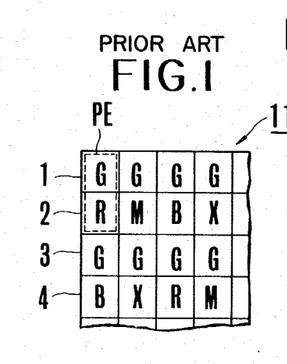
FIG. 1 shows the color arrangement of a color mosiac filter.

The color resolving filter for such a correlative process normally utilizes a construction in which the color filters are inversely arranged. That is, a number of kinds of color filters are arranged in a determined sequence along the horizontal scanning lines, while vertically, a color inverted in a determined correlation is arranged for each line. FIG. 1 shows an example of such an inverted filter arrangement.

Here, G identifies the green filter, R the red filter, B the blue filter, M the magenta filter and X the light shading part. The filters 1 in the first line are all G, those 2 in the second line are the repetition of R, M, B, X, those in the third line are all G, and those in the fourth line are the repetition of the B, X, R, M. Such a color mosaic filter is arranged so as to correspond to each picture element PE of the image pick-up part of a CCD (charge coupled device).

In this case as shown in FIG. 1, the filters 1 in the first line and filters 2 in the second line are respectively superposed on the upper half and the lower half of each picture element in 1H (horizontal scanning line). In the same way filters 3 in the third line and filters 4 in the fourth line are respectively superposed on the upper half and the lower half of each picture element in the next scanning line. Similarly each picture element forming the horizontal scanning line has two kinds of color filters superposed over it. When the signal formed on each picture element is horizontally scanned, the color output signal shown in FIG. 2(a) can be obtained.

Figure 2A:
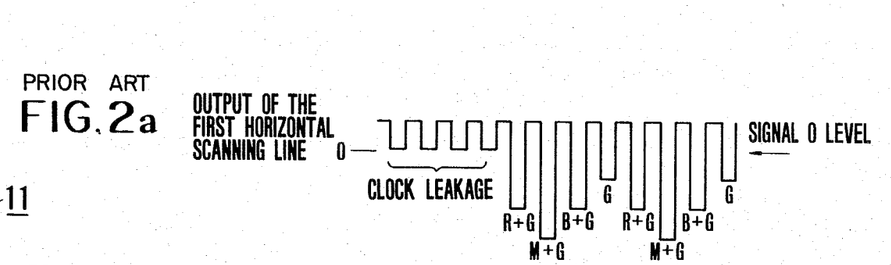
FIGS. 2(a)-2(d) show the signal waveforms of a solid state sensor.

In FIG. 2(a), a clock leakage portion without an image signal occurs at the beginning and then the sum signal of the two picture elements is produced in the superposed state on the clock leakage component. The clock leakage signal is the noise signal produced by the influence of the transferred clock signal of the CCD upon the output amplifier of the CCD.

Figure 2B:
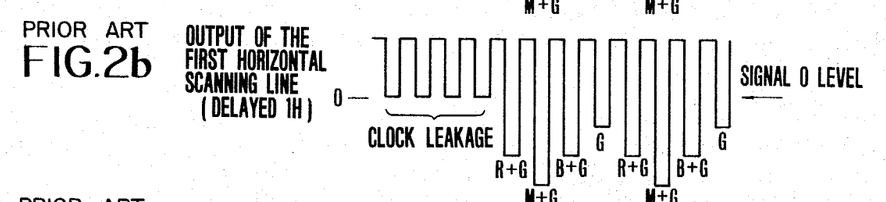

When the output of the solid state image sensor 11 is delayed 1H (1 horizontal scanning period) by a delay line, as is shown in FIG. 2(b) the clock leakage component is further added successively.

Figure 2C:
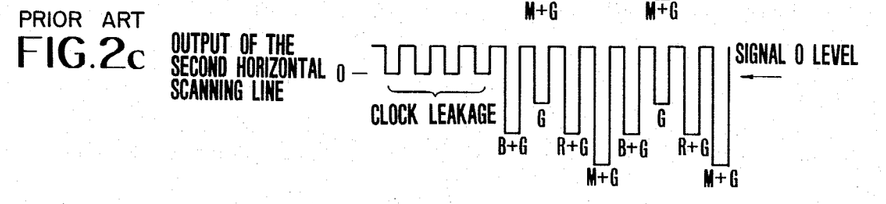
Figure 2D:
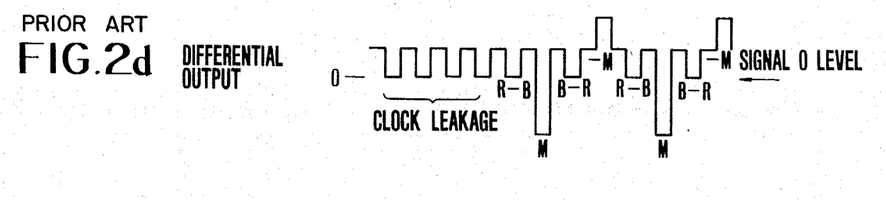

The signal on the second horizontal scanning line of the solid state image sensor, namely the signal of each picture element covered by the filters in the third and the fourth line is shown in FIG. 2(c). Then, the difference between the direct output signal (FIG. 2(c)) of the solid state image sensor and the 1H delayed signal (FIG. 2(b)) forms the differential signal as shown in FIG. 2(d). This is the difference between two adjacent horizontal scanning lines. When the clock leakage component of the direct output of the solid state image sensor and that of the output via the 1H delay element are largely different from each other, the differential signal also includes the clock leakage component as shown in FIG. 2(d).

By making use of the vertical correlation of the output of each picture element in this way, the luminance signal Y is obtained from the sum of the color outputs of two vertically adjacent horizontal scanning lines and the R−B signal and the M signal (corresponding to the R+B signal) is obtained from the differential signal as is shown in FIG. 2(d). By making use of the horizontal correlation in the line the R signal is obtained from the sum of R−B and M and the B signal from the difference. From the thus obtained signals Y, R and B for example a NTSC color signal can be obtained as the standard TV signal with the encoder (not shown in the drawing).

In the color solid state image pick-up device with the mosiac filter, the polarity of the R−B signal and that of the M signal are inverted every second clock period although R−B and M appear alternately from the differential signal 5 as is shown in FIG. 2(d). Hence, even if one tries to obtain R and B from R−B and M with the differential signal, the correct signals R, B cannot be obtained due to the above periodical polarity inversion.

SUMMARY OF THE INVENTION

It is an object of the present invention to provide a color solid state image pick-up device in which these conventional technical shortcomings can be eliminated.

It is another object of the present invention to provide an image pick-up device in which the outputs of the adjacent picture elements are correlatively processed by means of a mosaic filter, and which compensates for the periodic inverting phenomenon of the correlatively processed outputs so as to obtain the normal color signals.

It is yet another object of the present invention to provide an image pick-up device for carrying out the above compensation with a simple construction.

It is still another object of the present invention to provide an image pick-up device which carries out the above compensation and in which the correlatively processed outputs are periodically inverted, while the inversion level is controlled in a stabilized manner.

In accordance with the present invention the outputs of each picture element of the image sensor with the color resolving filters is correlatively treated with the output of the adjacent picture element in order to achieve the objects, whereby the inversion control means is provided so as to periodically invert the correlatively treated output.

In this way the inverted components in the correlative outputs are eliminated so as to always reproduce the normal color signal.

In accordance with an embodiment of the present invention multiplication means or subtracting means are used as inversion control means so that the construction is very simple.

Further, in accordance with an embodiment of the present invention the inversion control means comprises a level control means for controlling the inversion level in accordance with a given signal component included in the signal which is the correlative output inverted at a predetermined period, so that the stabilized inversion can always be obtained, while the color reproduction characteristics are stabilized relative to a temperature change.

DESCRIPTION OF THE PREFERRED EMBODIMENTS

Embodiments of the present invention are explained in detail in accordance with the accompanying drawings.

Figure 3:
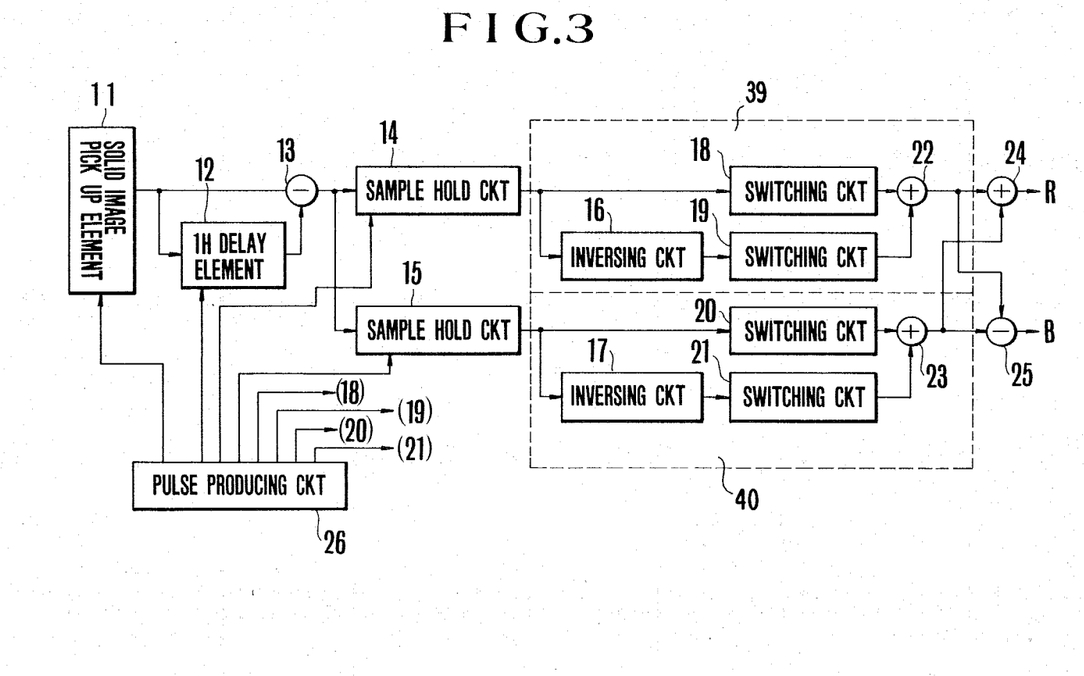
FIG. 3 shows an embodiment of the signal process circuit of the present invention as a block diagram.

FIG. 3 shows the first embodiment of the present invention. Here, the solid state image sensor 11 is covered by the color mosaic in FIG. 1. A 1H delay line 12 serves for delaying the output of the solid state image sensor 11 by 1H. A subtracting circuit 13 subtracts the output signal of the solid state image sensor 11 from the output signal of the 1H delay line 12. A sample hold circuit 14 holds the R−B signal inverted every two clock periods. A sample hold circuit 15 holds the M signal whose polarity is inverted every two clock periods. An inverting circuit 16 inverts the polarity of the output of the sample hold circuit. Switching circuits 18 and 19 are opened and closed with control pulses from the pulse producing circuit 26. An adding circuit 22 adds the output of the circuit 18 to that of 19. The inverting circuit 16, the switching circuit 18 and 19, the adding circuit 22 form an inverting process circuit 39.

The output of the sample hold circuit 15 is connected to a similar inverting process circuit 40. The latter includes an inverting circuit 17 corresponding to the circuit 16, switching circuits 20 and 21 corresponding to circuits 18 and 19 and an adding circuit 23 corresponding to circuit 22. An adding circuit 24 adds the output of the inverting process circuit 39 to that of 40. A subtracting circuit 25 subtracts the output of circuit 39 from that of circuit 40.

The operation of the circuit in FIG. 3 is as follows. The output of the subtracting circuit in FIG. 3 is, as explained, the differential signal 5 ( in FIG. 2(d)), namely R−B, M are inverted every two clock periods. This differential signal produces the R−B signal and the periodically inverted B−R signal which are applied to the sample hold circuit 14. The polarity of the output of the sample hold circuit 14 is inverted by the inverting circuit 16. The switching circuits 18 and 19 are alternately opened and closed with timing such that the polarity of their outputs are positive. Thus, the adding circuit 22 always produces the R−B signal with positive polarity. In the same way the sample hold circuit 15 holds the M signal whose polarity is inverted every two clock periods. Thus the adding circuit 23 produces the M signal whose polarity is always positive with the inverting circuit 17 and the switching circuits 20 and 21. On the other hand the adding circuit 24 produces the R signal which is the addition of R−B and M, while the subtracting circuit 25 produces the B signal which is the difference between R−B and M.

As explained above, the present invention uses the multiple output signal of the solid image pick-up element 11 to produce the correct color signal of R,B.

Figure 4:
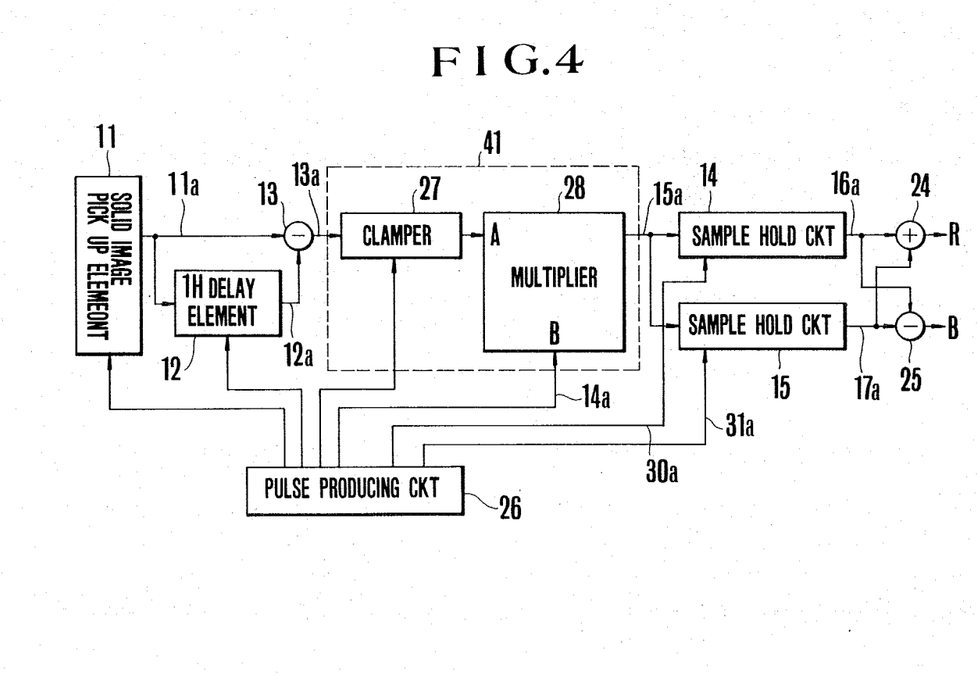
FIG. 4 shows another embodiment of the signal process circuit as a block diagram, wherein a part of the embodiment in FIG. 3 is modified such that an inversion logic circuit includes a clamp circuit and a multiplication circuit.

FIG. 4 shows the second embodiment of the simple circuit construction, wherein the inverting process circuit includes a clamp circuit and a multiplying circuit. Members with the same reference signals as those in FIG. 3 are the same members. In FIG. 4, a clamp circuit 27 clamps the differential signal, a multiplier 28 multiplies the clamped signal with an inverting control signal 14a to be explained and a sample hold circuit 14 serves for holding the R−B signal. A sample hold circuit 15 holds the M signal and the clamp circuit 27 and the multiplying circuit 28 constitutes the inverting process circuit 41.

Figure 5A:
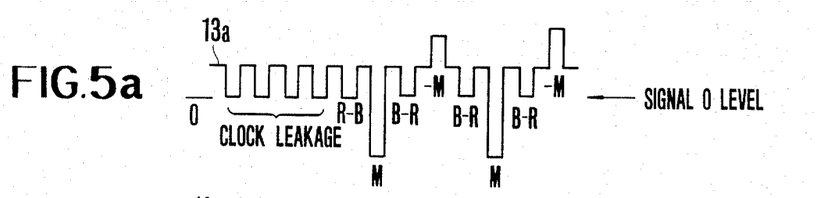
FIGS. 5(a)-5(g) show the signal waveforms of the embodiment in FIG. 4.

The operation of the above construction is explained with respect to FIGS. 5(a) to 5(g). As is shown in FIG. 5(a) the subtracting circuit 13 produces a differential signal 13a (corresponding to the differential signal 5 in FIG. 2(d)) between two horizontal scanning lines. For the several clock cycles or pulses at the beginning of the horizontal scan of the differential signal, a part in which the video signal is at the zero level is provided by arranging a light shading part at the beginning of each line of the solid state image sensor. The zero level of the whole image signal is clamped at the peak level of the image for the first several clock cycles or pulses.

In this way the potential of the black level of the signal is fixed so as to check the low frequency noise produced with the capacitive connection. When as in case of the differential signal 13a a clock leakage part remains in the black level, the clamp circuit 27 is desired to be such a one that clamps only dthe D.C. component or the low band component in the clock leakage signal and does not respond to the clock component.

The clamped differential signal 13a between the horizontal lines is applied to the input A of the multiplication circuit 28. Further, the input B of the multiplication circuit 28 receives the inverting control signal 14 shown in FIG. 5(b). The multiplication circuit 28 produces the multiplication signal 15a of the differential signal 13a with the inverting control signal 14a. The output signal 15a is the differential signal 13a inverted every two clock periods and the repetitition of the sequence R−B, M, R−B, M, . . . Then the sample hold circuit 14 responds to the multiplication signal 15a by picking up the R−B signals 16a as shown in FIG. 5(f) by using sample pulses 30a timed as shown in FIG. 5(d). The sample hold circuit 15 picks up the M signal 17a as shown in FIG. 5(g) with sample pulses 13a times as shown in FIG. 5(e).

Figure 5B:
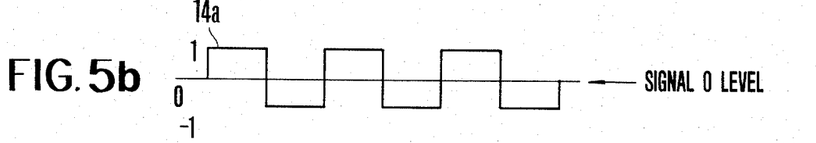
Figure 5C:
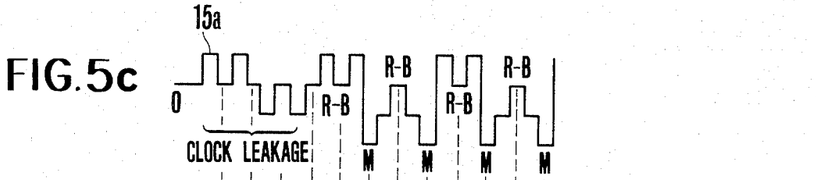
Figure 5D:
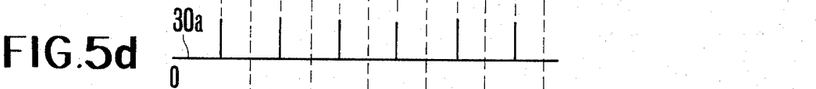
Figure 5E:
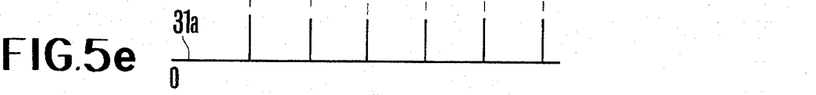
Figure 5F:
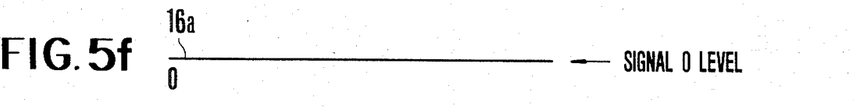
Figure 5G:
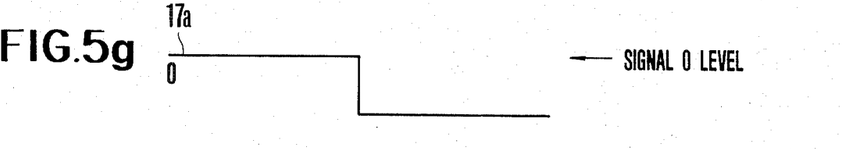

If the saturation characteristics of the output of the multiplier 28 is symmetrical with the polarity of the signal applied to the B input, the same effect can be obtained if the inverting control signal 14a to the B input terminal is sinusoidal or vertically asymmetrical with the amplitude above the saturation input level at B input and need not be the symmetrical rectangular form as is shown in FIG. 5(b).

In case the multiplication element for product detection such as NC 1496 of Motorola is used as the multiplier 28, the above-mentioned characteristics can be obtained, while several 100 mV is sufficient for the amplitude of the inverting control signal because the saturation level of the B input is small.

Further, the same effect can be obtained with a divider instead of the multiplier 28.

As in the above embodiment by forming the inverting process circuit with a clamper and multiplier, the R,B signal can be obtained in a simple way.

The above-mentioned inverting process circuit composed of the clamper and the multiplier makes it possible to invert or eliminate the signal only by changing the inverting control signal to be applied to the B input. The above circuit can be widely applied for various embodiment for obtaining the R, B signal.

FIGS. 6(a)-6(f) respectively show embodiments having the above inverting process circuit. The members having the same figures as the preceding embodiments are the same members.

Figure 6A:
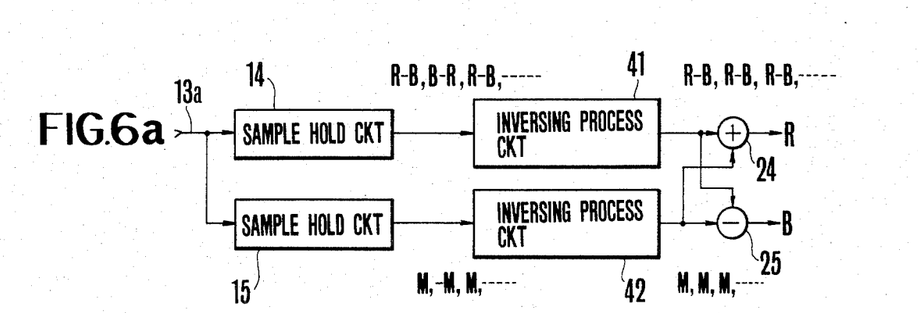
FIGS. 6(a)-6(f) shows further other embodiments of the signal process circuits of the present invention.
Figure 6B:
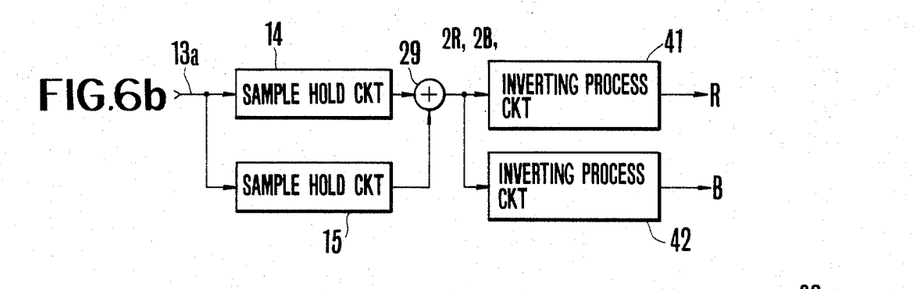
Figure 6C:
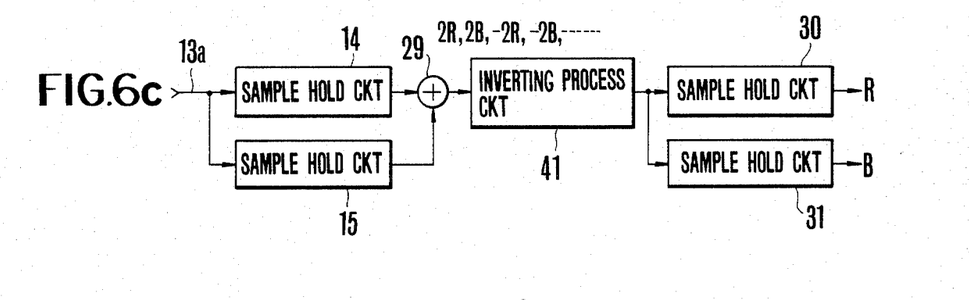
Figure 6D:
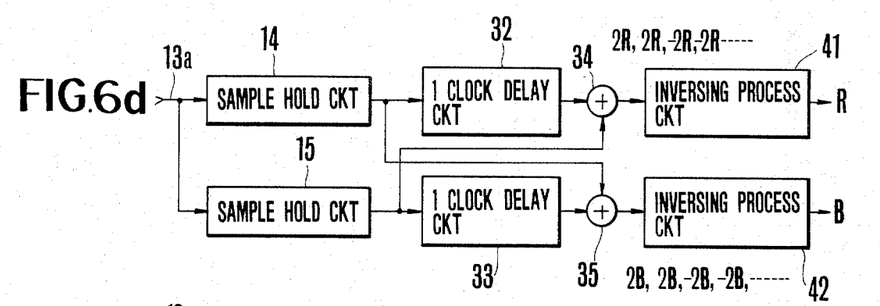

In FIG. 6(d), clock delay circuits for delaying circuits 32 and 33 delay the signals by 1 clock period.

In FIG. 6(a), the sample hold circuit 14 picks R−B and B−R signals out of the differential signal 13a (corresponding to the differential signal in FIG. 5), the sample hold circuit 15 the signals M, −M, ... and the inverting process circuits 41 and 42 invert the outputs of the sample hold circuits every 2 clock periods so as to obtain signals R−B, M.

In FIG. 6(b), the sample hold circuits 14,15 respond to the differential signal 13a by picking out signals R−B, B−R, R−B and M, −M, M ... every 2 clock periods. The latter signals are summed in the adding circuit 29 so as to obtain 2R, 2B, −2R, −2B, ... at the clock period. Then, the inverting process circuit 41 inverts and takes out the R signal every 2 clock pulses, while the inverting process circuit 42 takes out the signal B in the same manner.

In the same way as in FIG. 6(b), in FIG. 6(c), the adding circuit 29 furnishes the signals −2R, −2B ... and the inverting process circuit 41 inverts them every 2 clock periods. The signals R and B are taken out with the sample hold circuits 30, 31.

In FIG. 6(d), the sample hold circuit 14 picks up R−B, B−R, ..., the sample hold circuit 15 picks up M, −M, ..., the signals R−B, B−R, ... and are delayed by one clock period with the 1 clock period delay circuit and added to the signals M, −M, ... in the adding circuit 34 so as to obtain the signals 2R, 2R, −2R, −2R, ..., which are inverted every 2 clock periods with the inverting process circuit 41 so as to obtain the R signal. In the same way the B signal is obtained with the 1 clock delay circuit 33, the adding circuit 35 and the inverting process circuit 42.

Figure 6E:
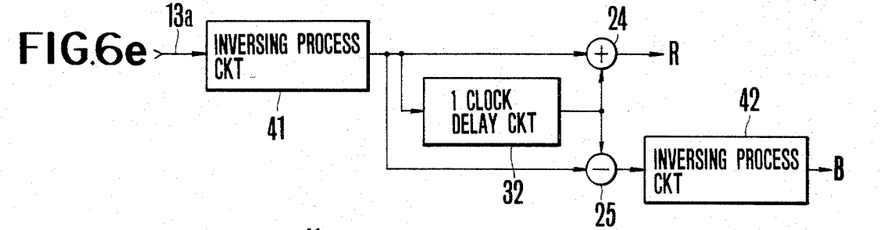

In FIG. 6(e), the inverting process circuit 41 inverts the differential signal 13a every 2 clock periods, the output of the inverting process circuit 41 is delayed 1 clock period with the 1 clock delay circuit 32 and added to the output of the inverting process circuit 41 so as to obtain the R signal, or obtained from the output of circuit 41 so as to produce the B, −B, B ... signal. From the latter, the B signal is obtained using the inverting process circuit 42 for inverting at 1 clock period.

Figure 6F:
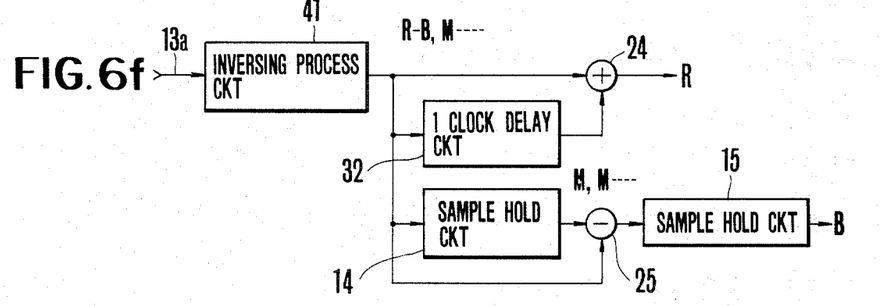

In FIG. 6(f), the inverting process circuit 41 inverts the differential signal 13a every 2 clock periods so as to obtain the R signal in the same way as in FIG. 6(e). The output of the inverting process circuit 41 is sensed and M is picked out with the sample hold circuit 14 and deducted from the output of the inverting process circuit 14 so as to obtain the signals B, O, B, O, ..., from which the B signal is obtained with the sample hold circuit 15.

Automatic adjustment of the inverting standard potential of the adding circuit, as an improvement of the embodiment shown in FIG. 4 is explained below.

First, the phenomenon of a varying inverting standard potential is considered with the circuit of the embodiment in FIG. 4 and the wave forms in FIG. 7.

Figures 7A, 7B:
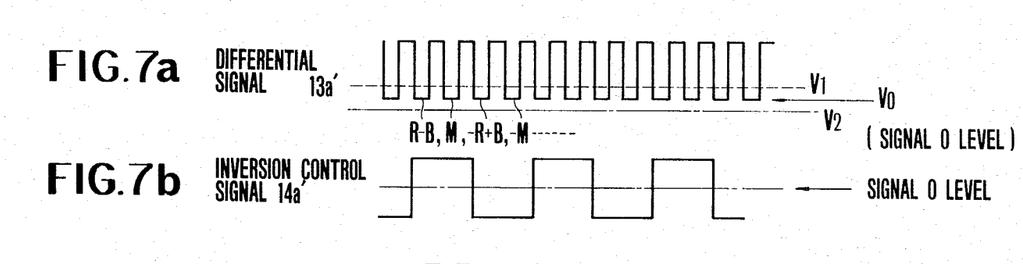
FIGS. 7(a)-7(f) show the signal waveforms for explaining the growth of the undesired signals due to deviation in the inversion standard potential.

The differential signal 13a' shown in FIG. 7(a) is the output of the subtracting circuit 13 in FIG. 4 when the object is black. When the differential signal 13a' is inversed every 2 clock periods, the center of the inversion has to be the inverting standard potential V0 which is the zero level of the signal shown in FIG. 7(a). When the inverting standard potential changes to V1 or V2 in FIG. 7(a) due to the influence of the off-set of the A input of the multiplier 28, an undesired signal to be explained occurs.

Figures 7C, 7D:
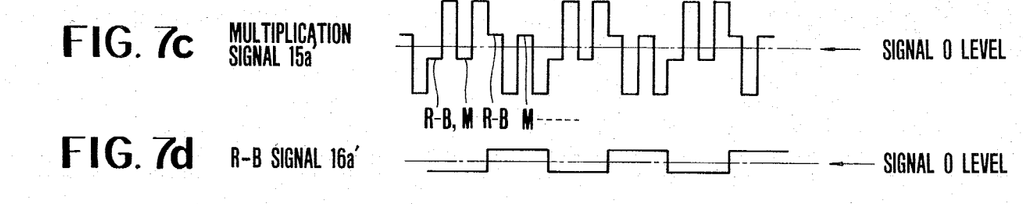
Figure 7E:
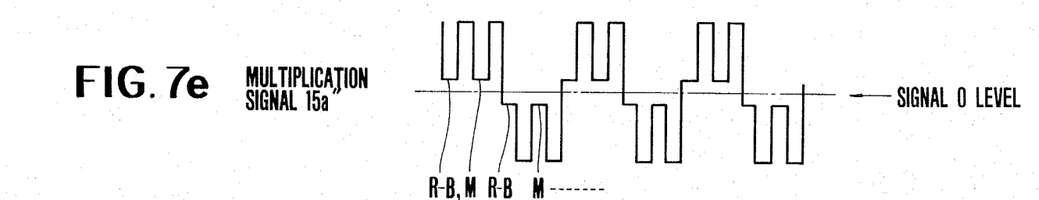

When the R−B signal is picked from the multiplication signal 15a' in FIG. 7(c) which is the output of the multiplier 28 when the differential signal 13a' is inverted every 2 clock periods with the center of the inverting standard potential V1, the output signal includes, as shown in the R−B signal in FIG. 7(d), an undesired component of the inverting control signal (hereinafter called undesired component) which is inverted in phase to the inverting control signal 14a. This undesired component produces an undesired noise component for the image signal.

Figure 7F:
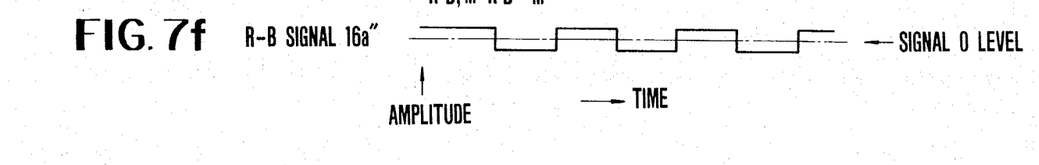

When on the other hand, the inverting standard potential is V2, as is shown in the R−B signal 16a'' in FIG. 7(f) the R−B signal includes an undesired signal component whose phase is the same as that of the inverting control signal 14a. In the embodiment in FIG. 4, it is necessary to adjust the voltage in advance so that the inverting standard potential is V0. To obtain a sufficient stability with large temperature changes, special consideration is needed for the selection and the design of the parts.

Figure 8:
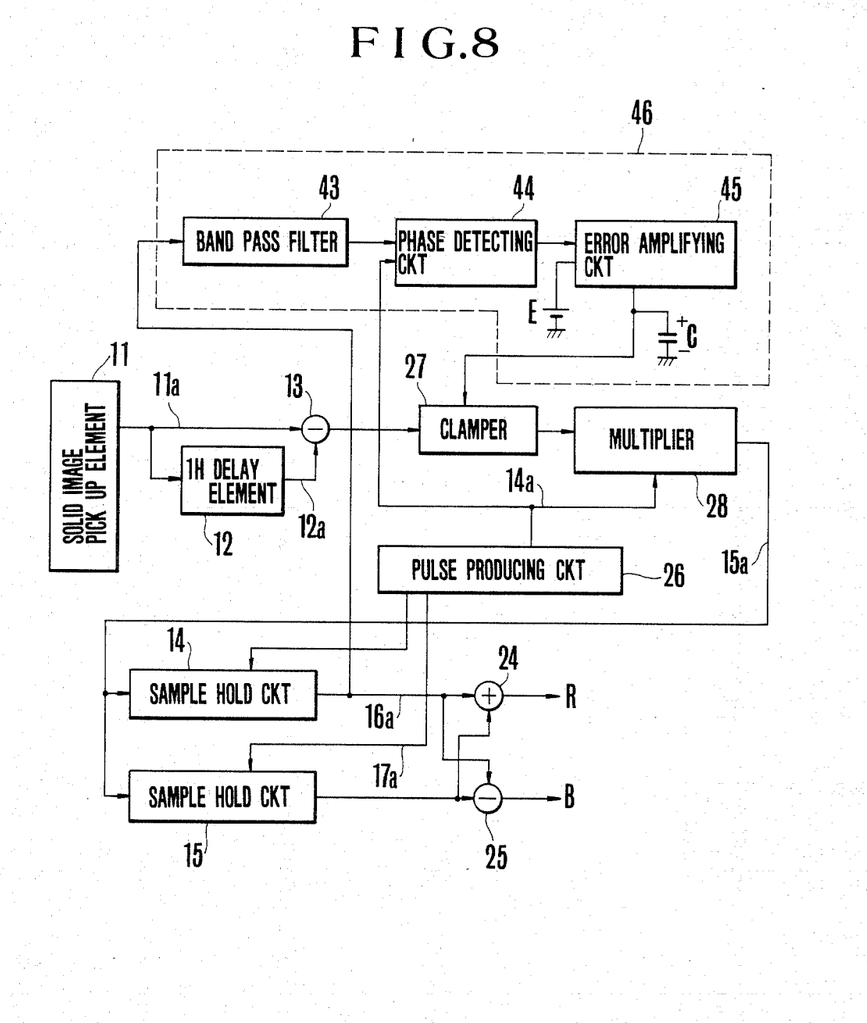
FIG. 8 shows an improved signal process circuit in block diagram from wherein the embodiment of FIG. 4 has the inversion standard potential automatically adjusted.

FIG. 8 shows an improved embodiment according to which the inverting standard potential is always correctly adjusted automatically. In the drawing, a band filter 43 passes a band with a frequency as large as one fourth of the number of the clock frequency. A phase detector circuit 44 detachs the phase of the undesired signal component with the inverting control signal with the frequency as large as one fourth of the number of the clock frequency. An error amplifying circuit 45 amplifies the error of the inverting standard potential.

The bandpass filter 43, the phase detector 44 and the error amplifying circuit 45 form the standard potential automatic adjusting block 46.

In operation, the undesired component of the inverting control signal from the output of the sample hold circuit 14 (or 15) of FIG. 8 has a frequency as large as one fourth of the clock frequency which therefore is detected by the band pass filter 43 for the above-mentioned frequency. The component is further detected in phase with the inverting control signal 14a at the same frequency so as to obtain the direction of the undesired component with reference to the D.C. level and the standard level. Comparing the undesired component with the standard potential in the error amplifying circuit 45 produces the error signal to control the clamp potential of the clamper 27 in such a manner that the inverting standard potential is always V0. It is also possible that the clamp potential be kept constant, while the off-set voltage for compensating the undesired signal is produced from the error voltage and added to the A input (differential input) of the multiplier 28.

In accordance with the present invention the periodic polarity inversion of the color signal decided with the color arrangement of the color mosiac filter is corrected so as to obtain the normal color signal with the right signal polarity. Forming the inverting circuit with the clamper and the multiplier achieves a normal color signal with a simple structure. Providing a block for automatically adjusting the inverting standard voltage permits elimination of the undesired signal component due to the change of ambient conditions without paying special attention to the temperature change in the selection of the parts and the design of the circuit. This makes the adjusting work easy.

What is claimed is:

1. A color solid state image pick-up device comprising:
   (a) a solid state image pick-up arrangement including a plurality of picture elements with photoelectric sensitivities, said picture elements forming rows and columns;
   (b) a filter arrangement including plural kinds of color filters each corresponding to the picture element, said plural kinds of color filters having a predetermined repeating pattern in the column and row directions;
   (c) correlation process means for obtaining correlative color outputs from a plurality of rows of signals;
   (d) inversion control means for inverting the correlative color outputs of the correlative process means at a predetermined period corresponding to the row directional repeating pattern of said color filters for the picture elements.

2. According to claim 1, wherein the inversion control means includes multiplication means.

3. According to claim 2, wherein the multiplication means is arranged to multiply the correlation output with the signal inverted at said predetermined period.

4. A device as in claim 1, wherein said filter is a mosaic filter.

5. According to claim 1, wherein said filter arrangement is such that same color filters are arranged in the same repeating pattern in each row of picture elements and the repeating patterns are shifted from each other in adjacent rows of the picture elements.

6. According to claim 1, wherein the filter arrangement includes a plurality of color filters each arranged for each picture element.

7. According to claim 1, wherein the inversion control means includes a level control means for controlling the inversion level.

8. According to claim 7, wherein the level control means includes a detecting means for detecting a predetermined component in the correlative output periodically inverted by the inversion control means.

9. According to claim 7, wherein said level control means includes a clamp means for changing clamping voltage in correspondence to outputs of said detecting means.

10. A color solid state pick-up device according to claim 1, wherein said inversion control means includes inverting means for inverting the correlative color output of said correlative process means, output means for producing said correlative color output without inverting it, and switching means for selectively permitting outputs of both said inverting means and said output means periodically.

11. An image sensing apparatus comprising:
    (a) a solid state image pick-up arrangement including a plurality of picture elements with photoelectric sensitivities, said picture elements forming rows and columns;
    (b) a filter arrangement including plural kinds of color filters having a predetermined repeating pattern;
    (c) correlation process means for obtaining correlative color outputs from the output signals of said photoelectric converting elements;
    (d) inversion control means for inverting the correlative color outputs of the correlation process means at a predetermined period; and
    (e) level control means for controlling a standard level of the inversion by the inversion control means in correspondence to a predetermined component in the correlative output periodically inverted by the inversion control means.

12. An image sensing apparatus according to claim 11, wherein said level control means controls the standard level in correspondence to the state of a component of predetermined frequency.

13. An image sensing apparatus according to claim 12, wherein said level control means controls a correcting direction of said standard level in correspondence to the phase of the signal component of predetermined frequency.

14. An image sensing apparatus according to claim 12, wherein said level control means controls a correction amount of the standard level in correspondence to the level of the signal component of predetermined frequency.

15. An image sensing apparatus according to claim 11, wherein said filter is a mosaic filter.

16. An image sensing apparatus according to claim 11, wherein said correlation process means forms the correlative color output from a plurality of rows of signals.

17. An image sensing apparatus according to claim 11, wherein said inversion control means inverts the outputs of the correlation process means at a frequency corresponding to the repeating pattern of the color filter.

* * * * *